United States Patent [19]

Meybeck

[11] 4,111,930
[45] Sep. 5, 1978

[54] MONOAZO DYES HAVING AN ARYLOXYALKYL GROUP ON THE NITROGEN ATOM IN THE PARA POSITION OF A 1,4-PHENYLENE COUPLING COMPONENT RADICAL

[75] Inventor: Jacques Meybeck, Boulogne, France

[73] Assignee: Sandoz Ltd., Basel, Switzerland

[21] Appl. No.: 669,165

[22] Filed: Mar. 22, 1976

Related U.S. Application Data

[63] Continuation of Ser. No. 286,437, Sep. 5, 1972, abandoned, which is a continuation-in-part of Ser. No. 49,580, Jun. 24, 1970, abandoned.

[30] Foreign Application Priority Data

Jul. 17, 1969 [CH] Switzerland ............ 10935/69

[51] Int. Cl.$^2$ .................. C09B 29/00; C09B 29/08; C09B 29/26; D06P 1/18
[52] U.S. Cl. ................ 260/207.5; 260/158; 260/205; 260/207; 260/207.1
[58] Field of Search ............ 260/158, 205, 206, 207, 260/207.1, 207.3, 207.5

[56] References Cited

U.S. PATENT DOCUMENTS

| | | | |
|---|---|---|---|
| 3,206,454 | 9/1965 | Merian et al. .............. | 260/205 |
| 3,314,935 | 4/1967 | Booth et al. .............. | 260/206 |
| 3,478,011 | 11/1969 | Artz .............. | 260/205 |
| 3,536,695 | 10/1970 | Groebke et al. .............. | 260/207.1 |
| 3,573,273 | 3/1971 | Seedfelder et al. .............. | 260/158 |
| 3,709,872 | 1/1973 | Koller .............. | 260/207.1 |

FOREIGN PATENT DOCUMENTS

| | | | |
|---|---|---|---|
| 1,946,459 | 9/1970 | Fed. Rep. of Germany ........ | 260/207.1 |
| 44-14,714 | 6/1969 | Japan .............. | 260/206 |
| 894,012 | 4/1962 | United Kingdom ............ | 260/207.1 |

*Primary Examiner*—Floyd D. Higel

*Attorney, Agent, or Firm*—Gerald D. Sharkin; Richard E. Vila; Melvyn M. Kassenoff

[57] ABSTRACT

Sparingly water-soluble azo compounds of the formula

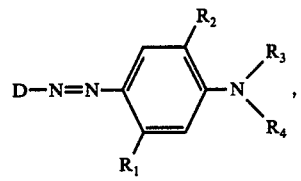

wherein
D is phenyl, substituted phenyl, thiazolyl, substituted thiazolyl, benzothiazolyl, substituted benzothiazolyl, 1,3,5-thiadiazolyl, phenyl-1,3,4-thiadiazolyl, nitrobenzoisothiazolyl or substituted thienyl, wherein each substituent of substituted phenyl, substituted thiazolyl and substituted benzothiazolyl is independently chloro, bromo, nitro, cyano or methylsulfonyl and each substituent of substituted thienyl is independently nitro or acetyl, $R_1$ is hydrogen, alkyl, alkoxy or —NH—Y—$R_5$, wherein Y is —CO—, —COO— or —SO$_2$—, and $R_5$ is alkyl, haloalkyl, phenyl or substituted phenyl, $R_2$ is hydrogen or alkoxy, $R_3$ is phenoxyalkyl, substituted phenoxyalkyl, benzyloxyalkyl or substituted benzyloxyalkyl, and $R_4$ is hydrogen, cyclohexyl, alkyl or alkyl substituted by chloro, bromo or —O—CO—NH—$R_6$, wherein $R_6$ is alkyl or phenyl are eminently suitable for application as disperse dyes. From aqueous dispersion such dyes build up powerfully on regenerated fibres and synthetic fibres of high molecular weight and hydrophobic character. Dyeings are obtained which are fast to thermofixation, sublimation, pleating, gas fumes, dry cleaning and wet treatments.

10 Claims, No Drawings

MONOAZO DYES HAVING AN ARYLOXYALKYL GROUP ON THE NITROGEN ATOM IN THE PARA POSITION OF A 1,4-PHENYLENE COUPLING COMPONENT RADICAL

This application is a continuation of application Ser. No. 286,437, filed Sept. 5, 1972 and now abandoned, which in turn is a continuation-in-part of application Ser. No. 49,580, filed June 24, 1970 and now abandoned.

This invention relates to azo compounds in which the coupling component contains an amino group bearing an aryloxyalkyl or aralkoxyalkyl substituent. These compounds are sparingly soluble in water and are eminently suitable for application as disperse dyes.

The new compounds are of the formula

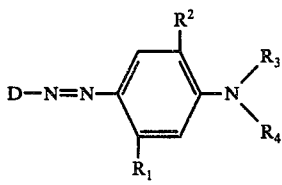

wherein

D in phenyl, thiazolyl or benzothiazolyl, which may be substituted by chlorine, bromine, nitro, cyano or methylsulfonyl; 1,3,5-thiadiazolyl or 1,3,4-thiadiazolyl which is substituted by a phenyl radical; nitrobenza-2,3-isothiazolyl or thienyl which is substituted by nitro and/or acetyl;

$R_1$ is hydrogen, alkyl of 1 or 2 carbon atoms, alkoxy of 1 or 2 carbon atoms or a group of the formula —NH—Y—$R_5$;

$R_2$ is hydrogen or alkoxy of 1 or 2 carbon atoms;

$R_3$ is phenoxyalkyl or benzyloxyalkyl where the said alkyls contain 1 to 3 carbon atoms and the phenyl nuclei may be substituted by chlorine, methyl or methoxy;

$R_4$ is hydrogen; cyclohexyl; or alkyl of 1 to 4 carbon atoms, which may be substituted by chlorine, bromine or a group of the formula -O-CO-NH-$R_6$;

$R_5$ is alkyl of 1 to 3 carbon atoms, which may be substituted by chlorine or bromine; or phenyl which may be substituted by chlorine, bromine or methyl;

$R_6$ is alkyl of 1 to 4 carbon atoms or phenyl; and

Y is —CO—, —COO— or —$SO_2$—. Preferred compounds correspond to the formula

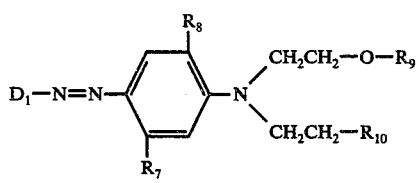

wherein $D_1$ is phenyl bearing at least one substituent from the group consisting of chlorine, bromine, nitro, cyano and methylsulfonyl, $R_7$ is hydrogen or a group of the formula —NH—Y—$R_5$, $R_8$ is hydrogen, methoxy or ethoxy, $R_9$ is phenyl or benzyl, $R_{10}$ is hydrogen or a group of the formula —O—CO—NH—$R_6$, $R_5$ is alkyl of 1 to 3 carbon atoms, which may bear as substituents chlorine or bromine; or phenyl, which may bear as substituents chlorine, bromine or methyl, $R_6$ is alkyl of 1 to 4 carbon atoms or phenyl and Y is —CO—, —CO—O— or —$SO_2$—.

The new compounds are produced by diazotization of an amine of the formula $$D-NH_2 \quad (III)$$

and coupling of the resulting diazonium compound with a compound of the formula

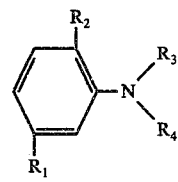

The coupling reaction normally takes place in acid, if necessary buffered, medium at temperatures in the range of $-10°$ to 40° C, preferably at 0°–5° C. Sodium acetate is most often used as buffering agent.

The new compounds are employed primarily as disperse dyes. It is desirable to convert them into dyeing preparations prior to application, using one of the standard methods, such as grinding in the presence of dispersing agents and/or fillers, for this purpose. The resulting pastes are dried in a vacuum or spray drier if dry preparations are desired. On addition of a suitable volume of water, the preparations can be exhaust dyed, pad dyed or printed at long or short liquor ratio as required.

From aqueous dispersions the dyes build up powerfully on regenerated fibres and synthetic fibres of high molecular weight and hydrophobic character. They are especially suitable for dyeing and printing textile products of linear aromatic polyester fibres, in particular goods of textured yarn, and of cellulose diacetate, cellulose triacetate and synthetic polyamide fibres. They are also applicable to polyolefins. Known exhaust dyeing, pad dyeing and printing methods are employed, for instance the process described in Frech Pat. No. 1,445,371.

The dyes migrate well and give dyeings of yellow to blue shade which are very fast to thermofixation, sublimation, pleating, gas fumes, cross dyeing, dry cleaning, lubricants and chlorine and have similarly good fastness to wet treatments, such as washing, perspiration, water and sea water. The dyeings are stable to precure and post-cure permanent press finishing. The dischargeability and the reserve of wool and cotton are good. The light fastness is very good, even in pale shades, which makes the dyes very suitable components for the production of fashionable pastel combination shades. The dyes show excellent covering power on barry material, whether the irregularities are due to differences in cold drawing in fibre manufacture, to differences in heat setting or to variations in texturizing. They are stable to long boiling times at temperatures from 80° to 140° C; this stability is not adversely affected by the liquor ratio or by the presence of dyeing accelerants.

The blue dyes of this invention are suitable for combination with samll amounts of red dyes to produce inexpensive navy blue dyeings which are dischargeable and show fastness to light, washing, perspiration, chlorine, sublimation, pleating and thermofixation. They can also be dyed in combination with red and yellow dyes to give black dyeings of comparably good fastness.

In comparison with the known disperse dyes in which the substituent R₃ is an alkoxyalkyl group, the dyes of the present invention are faster to sublimation.

The parts given in the following Example are by weight and the temperatures are in degress centigrade.

EXAMPLE 1

A mixture of 60 parts of water, 40 parts of concentrated sulphuric acid and 17.2 parts of 1-amino-2-chloro-4-nitrobenzene is prepared at room temperature with stirring. After the addition of 100 parts of ice a solution of 6.9 parts of sodium nitrite in 30 parts of water is added and diazotization is carried out for 2 hours at 0°–5°. Stirring is continued for 15 minutes, then 5 parts of aminosulphonic acid are added and the diazonium salt solution is clarified by filtration. In the course of 30 minutes 26 parts of N-ethyl-N-phenyloxyethylaminobenzene are added with stirring. The coupling reaction is completed in acid medium at 0°–5°. After 12 hours the dye formed is filtered, washed free of acid and dried. It dyes synthetic fibres in red shades with excellent fastness properties.

Further dyes of formula (I) which can be produced in accordance with this invention are given in the following table.

TABLE

| Ex. No. | D—NH₂ | R₁ | R₂ | R₃ | R₄ | Shade on polyester fibre |
|---|---|---|---|---|---|---|
| 2 | 1-Amino-2-chloro-4-nitrobenzene | H | H | —CH₂—CH₂—O—CH₂—C₆H₅ | —C₂H₅ | red |
| 3 | " | H | H | —CH₂—CH₂—O—C₆H₅ | —CH₃ | red |
| 4 | " | —NHCOCH₃ | H | " | —C₂H₅ | red |
| 5 | " | H | H | —CH₂—CH₂—O—C₆H₅ | H | scarlet |
| 6 | " | H | H | " | -Cyclohexyl | red |
| 7 | " | H | H | " | —CH₂—CH₂—OCONHC₂H₅ | red |
| 8 | " | H | H | " | —CH₂—CH₂—Cl | red |
| 9 | " | H | H | " | —CH₂—CH₂—OCO—NH—C₆H₅ | red |
| 10 | " | H | H | " | —CH₂CH₂OCO—NHCH₃ | red |
| 11 | 1-Amino-4-nitrobenzene | H | H | —CH₂—CH₂—O—C₆H₅ | —C₂H₅ | orange |
| 12 | " | H | H | —CH₂—CH₂—O—CH₂—C₆H₅ | " | orange |
| 13 | 1-Amino-2-bromo-6-cyano-4-nitrobenzene | —NHCOCH₃ | H | —CH₂—CH₂—O—C₆H₅ | " | blue-violet |
| 14 | " | —NHCO—C₆H₅ | H | " | " | " |
| 15 | " | —NHCOC₂H₅ | H | " | " | " |
| 16 | " | —NHCOOCH₃ | H | " | " | " |
| 17 | " | —NH—SO₂—CH₃ | H | " | " | " |
| 18 | 1-Amino-2-chloro-4-nitrobenzene | —NHCOOCH₃ | H | " | " | red-violet |
| 19 | 1-Amino-2,6-dichloro-4-nitrobenzene | H | H | " | " | yellow-brown |
| 20 | 1-Amino-2-bromo-6-chloro-4-nitrobenzene | H | H | " | " | " |
| 21 | 1-Amino-2,6-dichloro-4-nitrobenzene | H | H | —CH₂—CH₂—O—CH₂—C₆H₅ | " | orange |
| 22 | 1-Amino-2-chloro-4,6-dinitrobenzene | —NHCOCH₃ | —OC₂H₅ | " | " | blue |
| 23 | 1-Amino-2-bromo-4,6-dinitrobenzene | " | " | —CH₂—CH₂—O—C₆H₅ | " | blue |
| 24 | " | " | —OCH₃ | " | " | blue |
| 25 | " | —NHCOC₂H₅ | " | " | " | blue |
| 26 | " | " | " | " | " | blue |
| 27 | " | " | " | " | —CH₃ | blue |
| 28 | " | —NHCOCH₃ | —OC₂H₅ | —CH₂—CH₂—O—CH₂—C₆H₅ | H | blue |
| 29 | " | " | " | —CH₂—CH₂—O—C₆H₅ | H | blue |
| 30 | 2-Amino-6-methylsulphonylbenzothiazol | —NHCO—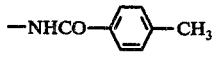—CH₃ | H | —CH₂CH₂—O—CH₂—C₆H₅ | —C₂H₅ | violet |
| 31 | " | —NHCO—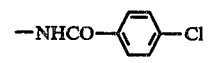—Cl | H | " | " | " |

TABLE-continued

| Ex. No. | D—NH$_2$ | R$_1$ | R$_2$ | R$_3$ | R$_4$ | Shade on polyester fibre |
|---|---|---|---|---|---|---|
| 32 | " | —NHCO—C$_6$H$_4$—Br | H | " | " | " |
| 33 | " | —NHCOCH$_3$ | H | —CH$_2$CH$_2$—O—C$_6$H$_4$—CH$_3$ | " | " |
| 34 | " | " | H | —CH$_2$CH$_2$—O—C$_6$H$_4$—OCH$_3$ | " | " |
| 35 | " | " | H | —CH$_2$CH$_2$—O—C$_6$H$_4$—Cl | " | " |
| 36 | 2-Amino-6-methyl-sulfonyl-benzothiazole | —NHCOCH$_2$CH$_2$Cl | H | —CH$_2$CH$_2$OC$_6$H$_5$ | " | " |
| 37 | 1-Amino-2-chloro-4-nitro-benzene | —OCH$_3$ | H | —CH$_2$CH$_2$—O—C$_6$H$_5$ | " | red |
| 38 | " | —NHCOCH$_2$CH$_2$Br | H | " | " | violet |
| 39 | " | H | H | —CH$_2$—CH(CH$_3$)—O—C$_2$H$_5$ | " | red |
| 40 | " | H | H | —CH(CH$_3$)—CH$_2$—O—C$_6$H$_5$ | " | red |
| 41 | 1-Amino-2-chloro-4-nitro-benzene | H | H | —CH$_2$CH$_2$CH$_2$OC$_6$H$_5$ | " | red |
| 42 | " | H | H | —CH$_2$CH$_2$OC$_6$H$_5$ | —CH$_2$CH$_2$CH$_3$ | red |
| 43 | " | H | H | " | —CH$_2$CH$_2$CH$_2$CH$_3$ | red |
| 44 | 1-Amino-2-chloro-4-methyl-sulphonyl-benzene | H | H | —CH$_2$CH$_2$OC$_6$H$_5$ | —C$_2$H$_5$ | red |
| 45 | 2-Amino-6-chloro-benzo-thiazole | —NHCOCH$_3$ | H | —CH$_2$CH$_2$OC$_6$H$_5$ | " | blue |
| 46 | 2-Amino-6-bromo-benzo-thiazole | " | H | " | " | blue |
| 47 | 2-Amino-5-nitro-thiazol | H | H | —CH$_2$CH$_2$—O—C$_6$H$_5$ | " | blue |
| 48 | " | —NHCOCH$_3$ | H | " | " | blue |
| 49 | 2-Amino-5-methyl-sulfonyl-thiazole | H | H | " | " | blue |
| 50 | " | —NHCOCH$_3$ | H | " | " | blue |
| 51 | 2-Amino-6-methyl-sulfonyl-benzo-thiazole | H | H | " | " | red-violet |
| 52 | " | —CH$_3$ | H | " | " | violet |
| 53 | 2-Amino-6-chloro-benzo-thiazol | H | H | —CH$_2$—CH$_2$—O—C$_6$H$_5$ | " | red |
| 54 | " | —CH$_3$ | H | " | " | red |
| 55 | 2-Amino-5-nitro-thiazol | H | H | —CH$_2$—CH$_2$—O—CH$_2$C$_6$H$_5$ | " | blue |
| 56 | 2-Amino-5-methyl-sulfonyl-benthiazole | H | H | " | " | blue |
| 57 | 2-Amino-6-methyl-sulfonyl-benzo-thiazole | H | H | " | " | rubine |

Application Examples

A. A mixture of 7 parts of the dye produced as in Example 1, 4 parts of sodium dinaphthylmethanedisulphonate, 4 parts of sodium cetylsulphate and 5 parts of anhydrous sodium sulphate is ground in a ball mill for 48 hours to give a fine powder. One part of the powder is dispersed in a little water and the dispersion added through a sieve to a bath of 4000 parts of water containing 2 parts of sodium lauryl sulphate. The liquor ratio is 40:1. 100 parts of a secured polyester fabric are entered into the bath at 40°–50°, then 20 parts of an emulsion of a chlorinated benzene in water are added, the temperature raised slowly to 100° and the fabric dyed for 1-2hours at 95°–100°. On removal it is washed off, soaped, rinsed and dried. A level red dyeing of good depth is obtained which is very fast to light, cross dyeing, washing, water, sea water, perspiration, sublimation, gas fumes, thermofixation, pleating and permanent press finishing.

B. A mixture of 30 parts of the dye of Example 1, 40 parts of sodium dinaphthylmethanedisulfonate, 50 parts of sodium cetylsulphate and 50 parts of anhydrous sodium sulphate is ground in a ball mill to form a fine powder. 4 Parts of the powder are added to 1000 parts of water at 40°–50°. Into this dyebath are entred 100 parts of a scoured polyester fabric. The bath is raised slowly to 130° and the fabric dyed at this temperature for about 60 minutes under pressure. Dyeing is followed by washing off, soaping, rinsing and drying. A red dyeing with comparable fastness properties to that of Application Example A is obtained.

Especially preferred dyestuffs of the foregoing Examples are as follows:

Example 1

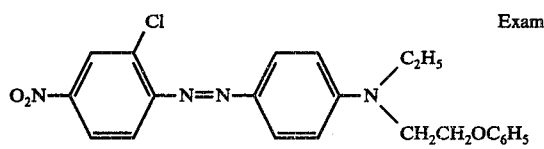

Example 2

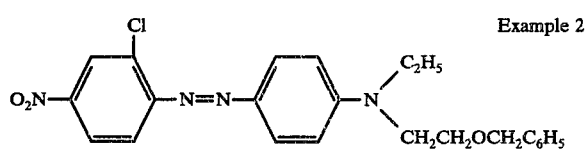

Example 47

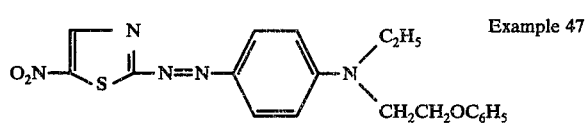

Example 48

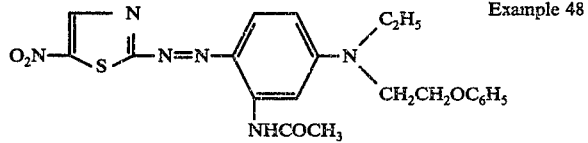

Example 53

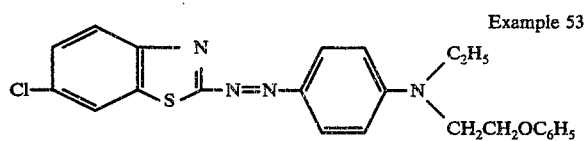

Example 45

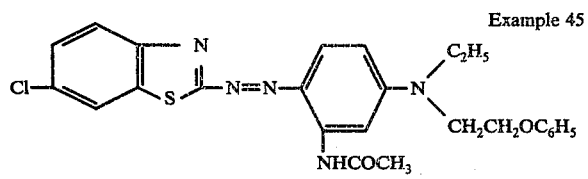

Having thus disclosed the invention what we claim is:
1. A compound of the formula

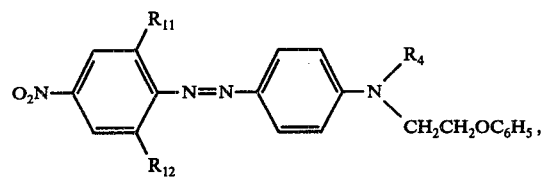

wherein
$R_4$ is hydrogen, methyl, ethyl or cyclohexyl,
$R_{11}$ is hydrogen, chloro or bromo, and
$R_{12}$ is hydrogen or chloro.

2. A compound according to claim 1 wherein
$R_4$ is ethyl,
$R_{11}$ is hydrogen, chloro or bromo, and
$R_{12}$ is hydrogen or chloro, with the proviso that $R_{11}$ can be bromo only when $R_{12}$ is chloro.

3. A compound of the formula

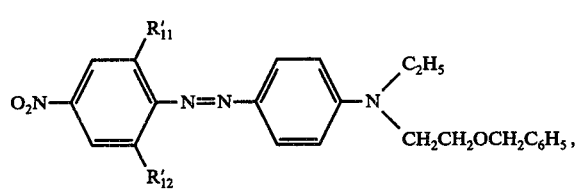

wherein
$R_{11}'$ is hydrogen or chloro, and
$R_{12}'$ is hydrogen or chloro.

4. The compound according to claim 3 having the formula

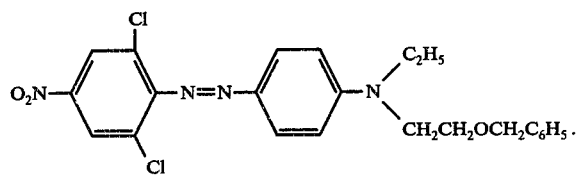

5. The compound according to claim 2 having the formula

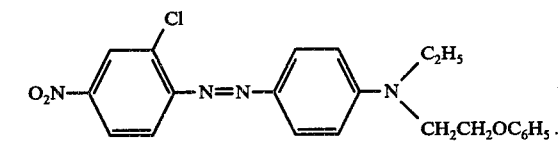

6. The compound according to claim 2 having the formula

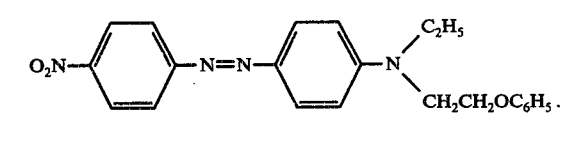

7. The compound according to claim 2 having the formula

8. The compound according to claim 2 having the formula
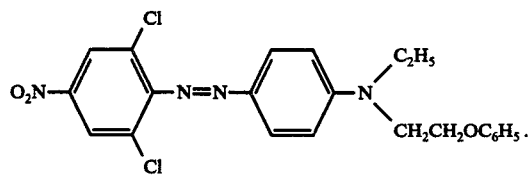
9. The compound according to claim 3 having the formula
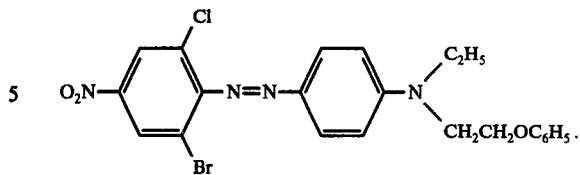
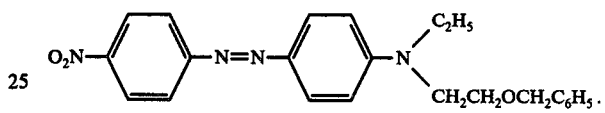
10. The compound according to claim 3 having the formula
$O_2N$—⟨ ⟩—N=N—⟨ ⟩—N(C_2H_5)(CH_2CH_2OCH_2C_6H_5).
* * * * *